US009508166B2

(12) United States Patent
Bonacina et al.

(10) Patent No.: US 9,508,166 B2
(45) Date of Patent: Nov. 29, 2016

(54) SMOOTHING AND GPU-ENABLED RENDERING OF DIGITAL INK

(71) Applicant: MICROSOFT CORPORATION, Redmond, WA (US)

(72) Inventors: Silvano Bonacina, Redmond, WA (US); Aleksandar Uzelac, Seattle, WA (US); Austin Bradley Hodges, Seattle, WA (US); David Abzarian, Kenmore, WA (US); Fei Su, Issaquah, WA (US); Miles M Cohen, Seattle, WA (US); Anthony John Rolls Hodsdon, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 32 days.

(21) Appl. No.: 14/486,735

(22) Filed: Sep. 15, 2014

(65) Prior Publication Data

US 2016/0078649 A1    Mar. 17, 2016

(51) Int. Cl.
*G06T 11/20* (2006.01)
*G06F 17/24* (2006.01)
*G06F 3/041* (2006.01)
*G06K 9/00* (2006.01)
(Continued)

(52) U.S. Cl.
CPC ......... *G06T 11/203* (2013.01); *G06F 3/03545* (2013.01); *G06F 3/0416* (2013.01); *G06F 3/04883* (2013.01); *G06F 17/242* (2013.01); *G06K 9/00402* (2013.01); *G06K 9/222* (2013.01)

(58) Field of Classification Search
CPC .. G06F 3/03545; G06F 3/0488; G06F 3/017; G06F 3/14; G06F 17/214; G06F 17/242; G06T 11/203; G06T 11/60
See application file for complete search history.

(56) References Cited

U.S. PATENT DOCUMENTS 5,367,617 A    11/1994   Goossen et al.
5,694,535 A *  12/1997   Broekhuijsen ........ G06T 11/203
                                                 345/442
(Continued)

FOREIGN PATENT DOCUMENTS

EP    0762265 A2    3/1997

OTHER PUBLICATIONS

"International Search Report & Written Opinion Issued in PCT Patent Application No. PCT/US2015/050097", Mailed Date: Nov. 27, 2015, 11 Pages.
(Continued)

*Primary Examiner* — Jeffrey Chow
(74) *Attorney, Agent, or Firm* — Timothy Churna; Judy Yee; Micky Minhas

(57) ABSTRACT

Systems, methods, and computer-readable storage media are provided for efficient real-time ink stroke smoothing, trajectory prediction, and GPU-leveraged rendering of ink stroke input. First and second ink points are received and an active Bézier approximation is computed based thereupon. Sequentially later in time that the first and second ink points, a third ink point is received. It is determined whether the third ink point adequately fits the active Bézier approximation. Where it is determined that the third ink point adequately fits, an updated active Bézier approximation is computed that includes the first, second and third ink points. Where it is determined that the third ink point fails to adequately fit, a different new Bézier approximation is computed that includes the third ink point but not the first and second ink points. Leveraging a GPU, a smoothed ink stroke based upon the Bézier approximation(s) is rendered.

20 Claims, 10 Drawing Sheets

(51) Int. Cl.
*G06K 9/22* (2006.01)
*G06F 3/0488* (2013.01)
*G06F 3/0354* (2013.01)

(56) References Cited

U.S. PATENT DOCUMENTS

| | | | |
|---|---|---|---|
| 6,101,280 A | 8/2000 | Reynolds et al. | |
| 6,850,228 B1 | 2/2005 | Parks | |
| 7,091,963 B2 | 8/2006 | Dresevic et al. | |
| 7,196,707 B2 * | 3/2007 | Davignon | G06T 11/203 |
| | | | 345/442 |
| 7,284,192 B2 | 10/2007 | Kashi et al. | |
| 2003/0123745 A1 | 7/2003 | Bryborn | |
| 2003/0235336 A1 | 12/2003 | Biswas et al. | |
| 2004/0066378 A1 * | 4/2004 | Dresevic | G06F 3/04883 |
| | | | 345/173 |
| 2005/0162413 A1 | 7/2005 | Dresevic et al. | |
| 2011/0199297 A1 | 8/2011 | Antonyuk et al. | |
| 2011/0298807 A1 * | 12/2011 | Kim | G06T 11/203 |
| | | | 345/442 |
| 2012/0050293 A1 * | 3/2012 | Carlhian | G06T 11/203 |
| | | | 345/442 |
| 2012/0144283 A1 | 6/2012 | Hill et al. | |
| 2013/0198653 A1 | 8/2013 | Tse et al. | |
| 2013/0293554 A1 * | 11/2013 | Vostrikov | G06T 11/203 |
| | | | 345/442 |
| 2014/0078087 A1 * | 3/2014 | Ho | G06F 3/0412 |
| | | | 345/173 |
| 2014/0143692 A1 | 5/2014 | Wigdor et al. | |
| 2015/0301726 A1 * | 10/2015 | Mattiuzzo | G06F 3/041 |
| | | | 345/173 |

OTHER PUBLICATIONS

Mohamed, et al., "Active-Smoothing in Digital Ink Environments", In Proceedings of the International Workshop on Educational Multimedia and Multimedia Education, Sep. 28, 2007, pp. 119-120.

* cited by examiner

SMOOTHING AND GPU-ENABLED RENDERING OF DIGITAL INK

BACKGROUND

"Digital ink" refers to one or more strokes that are recorded from an input instrument, such as a mouse, a stylus/pen on a digitizer tablet, a capacitive stylus or capacitive object (e.g., a finger) on a capacitive touch digitizer, or a stylus/pen on a display screen integrated with a digitizer tablet that may or may not utilize a touch-sensitive display screen. As used herein, the term "ink" is used interchangeably with and refers to "digital ink." Additionally, the terms "pen" and/or "stylus" are used generically and interchangeably to refer to any type of input instrument. Each stroke may be stored as one or more ink points and each ink point may contain various properties including, by way of example only, pressure, tilt, azimuth, and coordinates (x, y) corresponding to a position of the input instrument. For instance, a user may move a pen along a touch-sensitive display screen of a computer system so as to draw a line or curve, and the computer system may sample the coordinates (x, y) along the trajectory of the input instrument tip position over time (or on any other interval as known to those of ordinary skill in the art) as the user moves the input instrument. These coordinates represent points along the curve or line input by a user and are referred to herein as "ink points."

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, and computer-readable storage media are provided for efficient real-time ink stroke smoothing and trajectory prediction. A plurality of ink points including at least a first and a second ink point is received. Based upon at least the first and second ink points (the exact quantity being determined, at least in part, on obtaining an adequate fit with respect to subsequently-received ink points, as more fully described below), an active Bézier approximation is computed. Sequentially in time to the first and second ink points, a third ink point is received and it is determined whether the third ink point adequately fits the active Bézier approximation. The third ink point is determined to adequate fit the active Bézier approximation if it is determined that a user would be unable to detect a difference there between upon rendering. Such determination is generally based upon a pre-determined threshold difference value. If it is determined that the third ink point adequately fits the active Bézier approximation, the active Bézier approximation is updated to include the third ink point. If, however, it is determined that the third ink point does not adequately fit the active Bézier approximation, the active Bézier approximation is terminated and a new Bézier approximation is computed. Smoothed ink output is rendered comprising the first, second and third ink points in association with a stroke receiving surface, for instance, a touch-sensitive display screen.

Embodiments of the present invention provide digital ink input that appears smooth during and after stroke input, even at significant zoom levels (e.g., zoom levels of 200-400%). Embodiments of the present invention further provide for smoothing and rendering of digital ink strokes such that changes to the stroke based upon smoothing are not substantially perceived by a user either during stroke input or post-stroke. Still further, in accordance with embodiments hereof, rendering latency is not increased and is often decreased by use of prediction techniques described further herein below.

These and other features of the invention will be apparent upon consideration of the following Detailed Description. It will be apparent to those skilled in the relevant technology, in light of the present specification, that alternate combinations of aspects of the invention, either alone or in combination with one or more elements of the steps defined herein, may be used s modifications or alterations of the invention or as part of the invention. It is intended that the written description of the invention contained herein covers such modifications and alterations.

BRIEF DESCRIPTION OF THE DRAWINGS

The foregoing Summary, as well a the following Detailed Description, is better understood when read in conjunction with the accompanying drawings, which are included by way of example, and not by way of limitation with regard to the claimed embodiments. In the accompanying drawings, elements are labeled with reference numerals wherein the first digit of a three-digit reference numeral, and the first two digits of a four-digit reference numeral, indicates the drawing number in which the element is first illustrated. The same reference numeral in different drawings refers to the same or a similar element.

DETAILED DESCRIPTION

Figure 1:
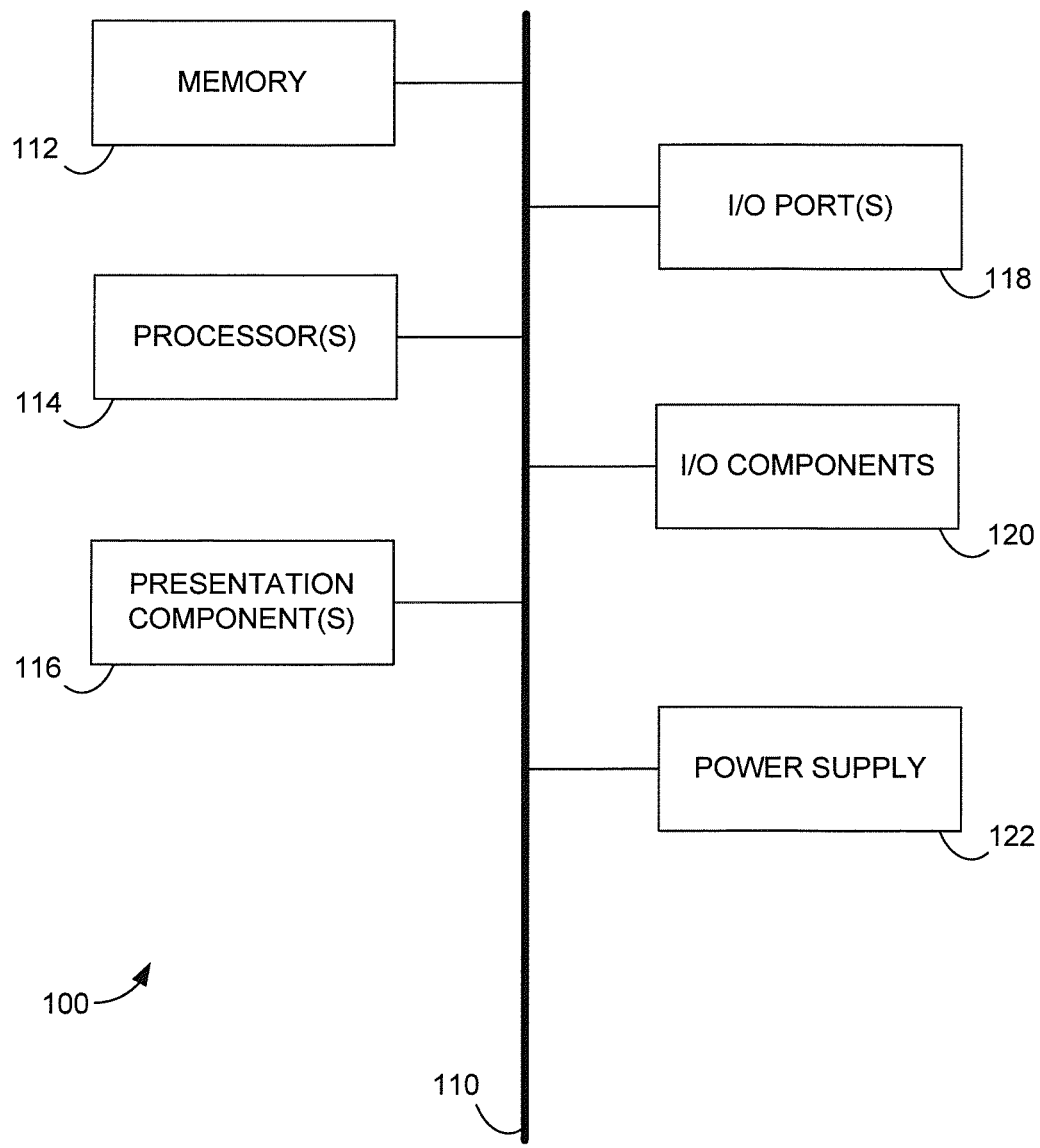
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The rendering of digital ink suffers from a number of problems including the ink not being smooth during zoom operations but rather having a step-like appearance, increases in latency (e.g., due to caching and/or post-stroke smoothing and rendering), and changes in ink color or other appearance characteristics when a pen or other input instrument is released from the receiving surface (i.e., post-stroke).

Various aspects of the technology described herein are generally directed to systems, methods, and computer-readable storage media for efficient real-time ink stroke smoothing, trajectory prediction, and rendering leveraging a GPU (Graphics Processing Unit). A plurality of ink points including at least a first and a second ink point is received as the respective ink points are digitized. Based upon at least the first and second ink points, an active Bézier approximation is computed. As will be understood by those of ordinary skill in the art, a Bézier approximation or curve is a parametric curve often utilized to model smooth curves in graphics rendering. As utilized herein, a Bézier approximation is considered "active" if it is the curve or approximation to which the most recently received and processed ink point (in this instance, the second ink point) belongs. The exact quantity of ink points utilized in the active Bezier approximation depends, at least in part on obtaining an adequate fit for subsequently-received ink points. That is, N ink points may be accumulated for the purposes of fitting, where the value of N continues to grow until an appropriate fit is no longer possible, as more fully described below.

Sequentially later in time with respect to the first and second ink points, a third ink point is received and it is determined whether the third ink point adequately fits the active Bézier approximation. The third ink point is determined to adequate fit the active Bézier approximation if it is determined that a user would be unable to detect a difference there between upon rendering. Such determination is generally based upon a pre-determined threshold difference value, for instance, 10 himetric units (0.1 mm). If it is determined that the third ink point adequately fits the active Bézier approximation, the active Bézier approximation is updated to include the third ink point. In embodiments, the "updated" Bézier approximation may be considered a "new" Bézier approximation or curve. If, however, it is determined that the third ink point does not adequately fit the active Bézier approximation, the active Bézier approximation is terminated and a different new Bézier approximation is computed. Leveraging a GPU, the resultant smoothed ink output is rendered, the resultant output comprising the first, second and third ink points, in association with a stroke receiving surface, for instance, a touch-sensitive display screen. (As will be understood and appreciated by those having ordinary skill in the art, while cubic Bézier smoothing is primarily described herein, quadratic Bézier smoothing, Bézier to the power of four and beyond, or any other known smoothing algorithm may be utilized within embodiments hereof.)

Accordingly, one embodiment of the present invention is directed a method being performed by one or more computing devices including at least one processor, the method for smoothing digital ink input. The method includes receiving a first ink point, receiving a second ink point, computing an active cubic Bézier approximation based on the first and second ink points, receiving a third ink point (the third ink point being received sequentially later in time than the first and second ink points), determining whether the third ink point adequately fits the active cubic Bézier approximation, and computing a new cubic Bézier approximation utilizing the first, second and third ink points. The new cubic Bézier approximation may comprise an updated active cubic Bézier approximation where it is determined that the third ink point adequately fits the active cubic Bézier approximation or a different new cubic Bézier approximation where it is determined that the third ink point fails to adequately fit the active cubic Bézier approximation.

In another embodiment, the present invention is directed to a system comprising a central processing unit (CPU) and a graphic processing unit (GPU). The CPU is configured to sequentially receive first and second ink points, generate an active smoothed ink fragment based on the first and second ink points, receive a third ink point (sequentially later in time), determine whether the third ink point adequately fits the active smoothed ink fragment and, upon determining that the third ink point adequately fits the active smoothed ink fragment, update the active smoothed ink fragment. Alternatively, upon determining that the third ink point does not adequately fit the active smoothed ink fragment, the CPU is configured to terminate the active smoothed ink fragment and initiate a second smoothed ink fragment. The GPU is configured to render smoothed ink output comprising the first, second and third ink points in association with a display surface In yet another embodiment, the present invention is directed to an apparatus, comprising at least one processor and a memory storing a digital ink smoothing and rendering routine. When executed by the at least one processor, the digital ink smoothing and rendering routine causes the apparatus to receive a first ink point; receive a second ink point; compute an active cubic Bézier approximation based on the first and second ink points; receive a third ink point (sequentially later in time with respect to the first and second ink points); determine whether the third ink point adequately fits the active cubic Bézier approximation; compute a new cubic Bézier approximation utilizing the first, second and third ink points; and render smoothed ink output comprising the first, second and third ink points in association with a display surface.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one component nor any combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Embodiments of the invention may be practiced in a variety of system configurations, including, but not limited to, hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (110) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components include a microphone, joystick, game pad, satellite dish, scanner, printer, display device, wireless device, a controller (such as a stylus, a keyboard and a mouse), a natural user interface (NUI), and the like. In embodiments, a pen digitizer (not shown) and accompanying input instrument (also not shown but which may include, by way of example only, a pen or a stylus) are provided in order to digitally capture freehand user input. The connection between the pen digitizer and processor(s) 114 may be direct or via a coupling utilizing a serial port, parallel port, and/or other interface and/or system bus known in the art. Furthermore, the digitizer input component may be a component separated from an output component such as a display device or, in some embodiments, the usable input area of a digitizer may be co-extensive with the display area of a display device, integrated with the display device, or may exist as a separate device overlaying or otherwise appended to a display device. Any and all such variations, and any combination thereof, are contemplated to be within the scope of embodiments of the present invention.

A NUI processes air gestures, voice, or other physiological inputs generated by a user. Appropriate NUI inputs may be interpreted as ink strokes for presentation in association with the computing device 100. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices. The computer-useable instructions form an interface to allow a computer to react according to a source of input. The instructions cooperate with other code segments to initiate a variety of tasks in response to data received in conjunction with the source of the received data.

Figure 2:
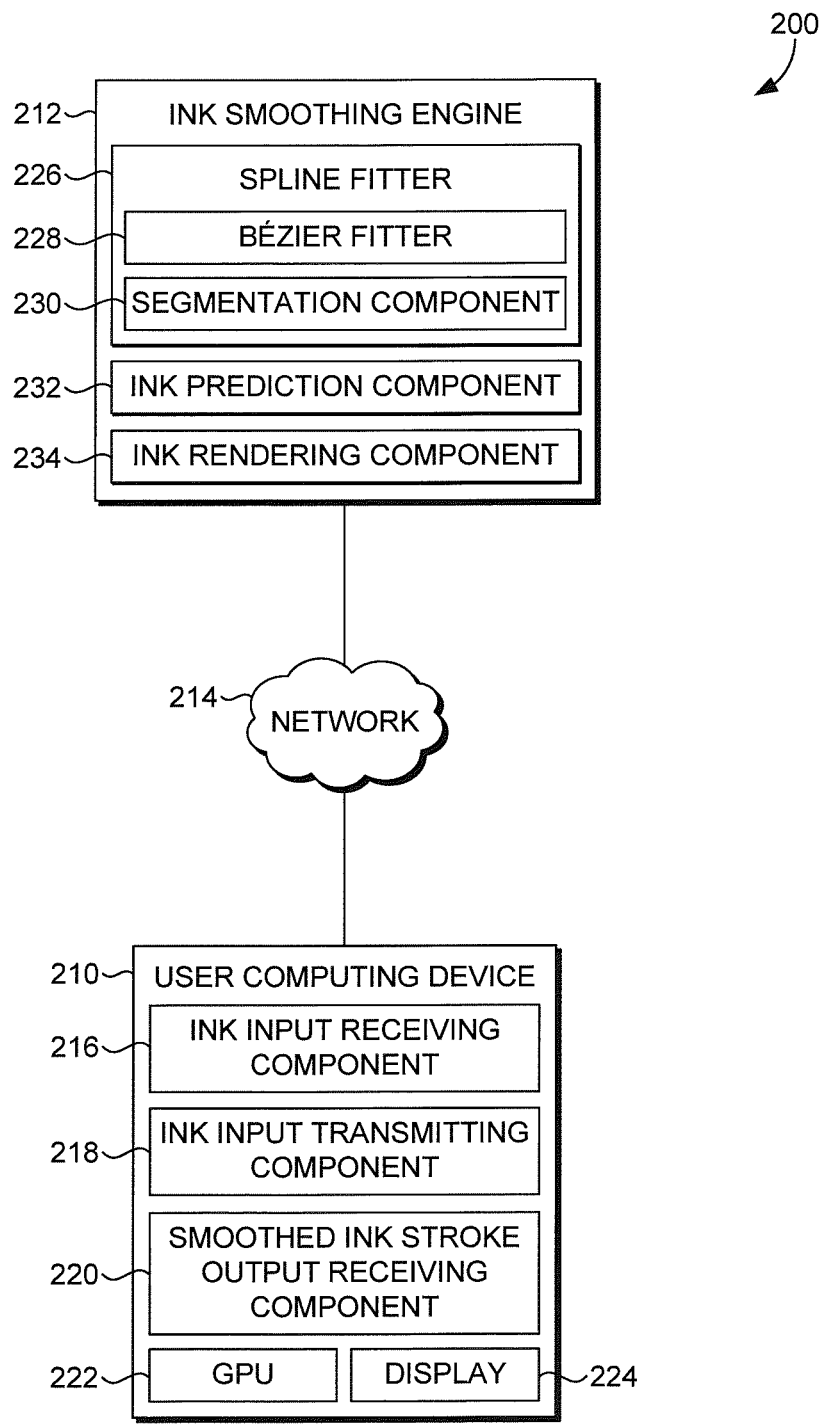
FIG. 2 is a block diagram of an exemplary computing system in which embodiments of the invention may be employed.

As previously set forth, embodiments of the present invention provide systems, methods, and computer-readable storage media for systems, methods, and computer-readable storage media are provided for efficient real-time ink stroke smoothing, trajectory prediction, and GPU-leveraged ink stroke rendering. With reference to FIG. 2, a block diagram is provided illustrating an exemplary computing system 200 in which embodiments of the present invention may be employed. Generally, the computing system 200 illustrates an environment in which digital ink input appears smooth during and after stroke input, even at significant zoom levels. The computing system 200 further illustrates an environment in which smoothing and rendering of digital ink strokes are provided such that changes to the stroke based upon smoothing and/or other processing are not substantially perceived by a user either during stroke input or post-stroke. Still further, the computing system 200 illustrates an environment in which rendering latency is not increased and is often decreased, at least in part, by use of prediction techniques described further herein below.

Among other components not shown, the computing system 200 generally includes a user computing device 210 configured for receiving digital ink input and providing smoothed ink output in association with a display 224, and an ink smoothing engine 212 configured for smoothing and predicting future ink stroke input, as more fully described below. In embodiments (and as shown in FIG. 2), the user computing device 210 and the ink smoothing engine 212 may be in communication with one another via a network 214. The network 214 may include, without limitation, one or more local area networks (LANs) and/or wide area networks (WANs). Such networking environments are commonplace in offices, enterprise-wide computer networks, intranets and the Internet. Accordingly, the network 214 is not further described herein.

It should be understood that any number of user computing devices 210 and/or ink smoothing engines 212 may be employed in the computing system 200 within the scope of embodiments of the present invention. Each may comprise a single device/interface or multiple devices/interfaces cooperating in a distributed environment. For instance, the ink smoothing engine 212 may comprise multiple devices and/or modules arranged in a distributed environment that collectively provide the functionality of the ink smoothing engine 212 described herein. Additionally, other components or modules not shown also may be included within the computing system 200.

In some embodiments, one or more of the illustrated components/modules may be implemented as stand-alone applications. In other embodiments, one or more of the illustrated components/modules may be implemented via the user computing device 210, the ink smoothing engine 212, or as an Internet-based service. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of ink smoothing engines 212 and/or user computing devices 210. By way of example only, the ink smoothing engine 212 might be provided as a single computing device, a cluster of computing devices, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown and/or described, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, applications, drivers, and/or software. For instance, various functions may be carried out by a processor executing instructions stored in memory.

The user computing device 210 may include any type of computing device, such as the computing device 100 described with reference to FIG. 1, for example. As illustrated, the user computing device 210 includes an ink input receiving component 216, an ink input transmitting component 218, a smoothed (and, in embodiments, extended) ink stroke output receiving component 220, and a GPU 222 for rendering smoothed ink output in association with a display 224. The ink input receiving component 216 is configured to receive user input of ink strokes, generally input via an I/O component, such as a pen or stylus. The ink input transmitting component 218 is configured to transmit ink strokes received by the ink input receiving component 216 to the ink smoothing engine 212, for instance, via the network 214. The smoothed ink stroke output receiving component 220 is configured to receive (generally from the ink smoothing engine 212 via the network 214, as more fully described below), smoothed ink output for rendering in association with the display 224. The GPU 222 is configured to process (as more fully described below) received smoothed ink output for rendering in association with the display 224.

It should be noted that the functionality described herein as being performed by any component of the user computing device 210 may be performed by any other application, application software, user interface, or the like capable of rendering graphics content. It should further be noted that embodiments of the present invention are equally applicable to mobile computing devices and devices accepting gesture, touch and/or voice input. Any and all such variations, and any combination thereof, are contemplated to be within the scope of embodiments of the present invention.

As illustrated, the ink smoothing engine 212 includes a spline fitter 226, an ink prediction component 232 and an ink rendering component 234. The spline fitter 226 is configured to approximate a stroke of ink points with a set of cubic Bézier segments. The spline fitter 226 is fed a single ink point at a time and for each new ink point, is configured to either update the active Bézier segment, or initiate a new Bézier segment if the new ink point cannot be fit well enough with the active Bézier segment. Thus, the spline fitter 226 includes two sub-components: a Bézier fitter 228 and a segmentation component 230.

The Bézier fitter 228 is configured to maintain a set of active points that is received sequentially one at a time as they are digitized. Each time the set is updated, the Bézier fitter 228 is configured to compute a new cubic Bézier approximation. However, the active set does not necessarily contain all the points since the beginning of the stroke as it may be reset by the segmentation component 230, as more fully described below.

The segmentation component 230 is configured to evaluate the quality of the fit produced by the Bézier fitter 228 and decide when to update the existing Bézier approximation and when to initiate a new Bézier approximation or curve. The Bézier fitter 228 also performs tasks such as cusp detection (more fully described below) and controls the analytic properties of the spline by configuring the Bézier fitter 228 (as more fully described below).

Bézier Fitter 228

This section describes how the Bézier fitter 228 approximates a set of ink points with a cubic Bézier approximation or curve. For brevity, only positional information is considered in the present description. However, it is straightforward to extend the formulas to any number of features. For instance, in some implementations, the radius of a received ink point (which may be proportional to the exercised pressure and the size of the input brush stroke) may be utilized. In other implementations, properties including tilt, azimuth, or the like may be used. Any and all such features, and any combination thereof, are contemplated to be within the scope of embodiments of the present invention.

At any given point in time the Bézier fitter 228 fits a set $S_k = \{p_0, p_1, \ldots, p_{k-1}\}$ of active points with one single Bézier segment, B(t). The fitting task is formulated as a minimization problem:

$$B^*(t) = \arg\min_B E,$$

where E is an error function that will be more fully described below.

Let P(t), $t \in [0,1]$ be the implicit polyline described by the set $S_k$. Then, $$P(0) = p_0$$

$$P(1) = p_{k-1}$$

Since it is expensive to compute the distance between a point on the polyline and the Bézier curve, in accordance with embodiments hereof, the distance between the two points obtained by sampling the polyline and the Bézier curve at the same value of the parameter t is approximated:

$$d(t) = \|(t) - P(t)\| = \sqrt{(B_x(t) - P_x(t))^2 + B_y(t) - P_y(t))^2}, t \in [0,1]$$

The error function for which minimization is desired may then be defined as:

$$E = E_N = \frac{1}{N} \cdot \sum_{i=0}^{N-1} d^2(t_i), \quad t_i \in [0, 1]$$

N=k and $t_i$ are selected such that $P(t_i) = p_i$, i=0, 1 ... k–1 so that the error function accounts for all and only the points in $S_k$. However, since a cubic approximation is being utilized, the sample includes at least four points.

Minimization

The variables of the minimization problem are B's control points. Let $C = [C_0, C_1, C_2, C_3]$ be the vector of control points. A gradient descent approach is used to find optimal values:

$$C^{j+1} = C^j - \alpha \cdot \nabla_{C^j}(E_N), \ 0 < \alpha \leq 1$$

The parameter a of the update rule controls the convergence rate. In general, less iteration is required with bigger values but at the same time the calculations may become unstable when a is big. One exemplary parameter a that may be utilized is:

$$\alpha^{j+1} = \frac{\text{average\_error}}{\max_i \nabla_{C_i^j}(E_N)}$$

Furthermore, the risk of divergence may be mitigated by dividing a by the number of iterations that did not produce any improvements on the fitting error.

$\nabla_{C^j}(E_N)$ is the gradient of the approximation error with respect to B's control points and may be computed as follows:

$$\nabla_C(E_N) = \frac{2}{N} \cdot \sum_{i=0}^{N-1} d(t_i) \cdot \nabla_C d(t_i)$$

$$= \frac{2}{N} \cdot \sum_{i=0}^{N-1} d(t_i) \cdot \nabla_B^T d(t_i) \cdot \nabla_C B(t_i)$$

$$= \frac{2}{N} \cdot \sum_{i=0}^{N-1} d(t_i) \cdot \nabla_B^T \left( \sqrt{(B_x(t_i) - P_x(t_i))^2 + (B_y(t_i) - P_y(t_i))^2} \right) \cdot \nabla_C B(t_i)$$

$$= \frac{2}{N} \cdot \sum_{i=0}^{N-1} \sqrt{(B_x(t_i) - P_x(t_i))^2 + (B_y(t_i) - P_y(t_i))^2} \cdot \frac{\nabla_B^T((B_x(t_i) - P_x(t_i))^2 + (B_y(t_i) - P_y(t_i))^2)}{2 \cdot \sqrt{(B_x(t_i) - P_x(t_i))^2 + (B_y(t_i) - P_y(t_i))^2}} \cdot \nabla_C B(t_i)$$

$$= \frac{1}{N} \cdot \sum_{i=0}^{N-1} \nabla_B^T((B_x(t_i) - P_x(t_i))^2 + (B_y(t_i) - P_y(t_i))^2) \cdot \nabla_C B(t_i)$$

$$= \frac{2}{N} \cdot \sum_{i=0}^{N-1} \begin{bmatrix} B_x(t_i) - P_x(t_i) \\ B_y(t_i) - P_y(t_i) \end{bmatrix} \cdot$$

$$[(1-t_i)^3 \quad 3 \cdot (1-t_i)^2 \cdot t \quad 3 \cdot (1-t_i) \cdot t_i^2 \quad t_i^3]$$

It should be noted that there are four degrees of freedom in the update rule, corresponding to the four control points of a cubic Bézier approximation. However, the segmentation component 230 described in the next section will use some of these degrees of freedom to impose desirable analytic properties (e.g., continuity) on the spline.

Segmentation Component 230

The segmentation component 230 accomplishes two base tasks. First, it decides whether to start a new Bézier approximation or update the current one. Second, it enforces analytic properties on the spline (most notably C0 or C1 continuity) by re-configuring the cubic Bézier fitter 228 any time a new approximation or curve is started. As utilized herein, and as will be understood by those of ordinary skill in the art, "continuity" refers to the relative smoothness at the joints at which adjacent Bézier curves connect. "C0 continuity" refers to situations where adjacent Bézier curves share the same endpoints. "C1 continuity" refers to situations where adjacent Bézier curves share both the same endpoints and the same derivatives.

The decision whether to start a new Bézier approximation or update the current one is based on the quality of the fit. More specifically, the decision whether to start a new Bézier approximation or update the current one is based on the maximum distance between the digitized ink points received and the best approximation computed by the cubic Bézier fitter 228. In embodiments, the cutoff threshold may be 10 himetric units (0.1 mm), a point above which users in a usability study indicated that ink changes as new points arrive (other than extending to the new point) were noticeable. It should be noted, however, that the threshold correlates with the physical size of the ink as it is being rendered. For example, if the wet ink (that is, ink rendered during stroke activity, before the input instrument is released from the receiving surface) is being rendered with 10× magnification, then the threshold likely would need to be 10 times smaller or the user will notice ink changes. Of course, since dry ink (i.e., the ink on the receiving surface once the input instrument is released therefrom) does not change (that is, the segmentation is already done) this point is meaningful only for wet ink. It should be further noted that the threshold may be a function of any quantity of previous ink points, any features of such ink points (e.g., coordinates, pressure, tilt, twist, etc.), and/or may be device dependent (e.g., DPI, available memory, CPU, GPU, and the like). Any and all such variations, and any combination thereof, are contemplated to be within the scope of embodiments of the present invention.

The other important task accomplished by the segmentation component 230 is to impose desirable analytic properties on the spline. At very least the spline must be connected (C0 continuity), which means that the first control point of each Bézier curve or segment must match with the last control point of the previous curve or segment thereby losing one degree of freedom:

C0 Continuity: $B_{s-1,3} = B_{s,0}$

Figure 3:
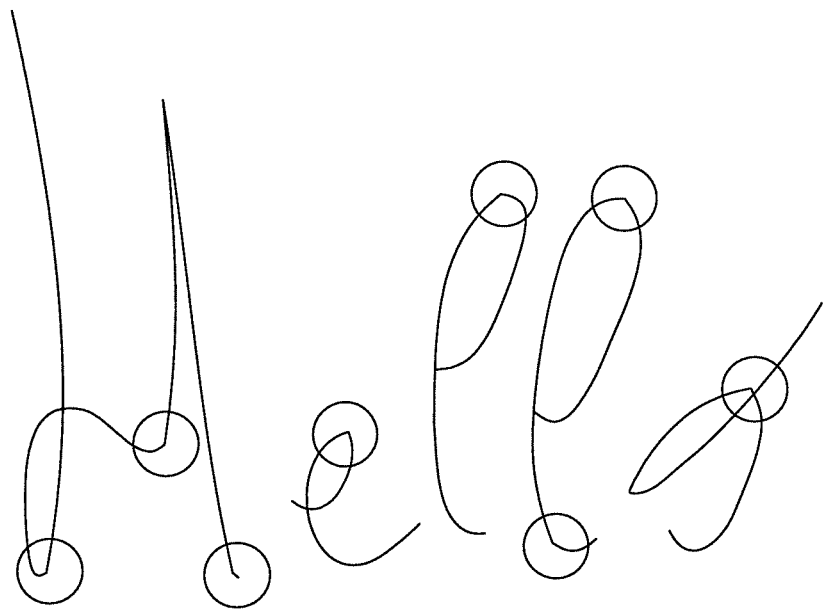
FIG. 3 is a schematic diagram showing exemplary "bad" artifacts of a C0 continuous spline that may be produced in accordance with an embodiment of the present invention.

While C0 continuity guarantees that the spline is connected, it is not enough to produce smooth ink as shown in FIG. 3, wherein the circled connection regions point out the bad (unsmoothed) artifacts.

In accordance with embodiments of the present invention, the bad artifacts in FIG. 3 may be removed by imposing C1 continuity. Parametric C1 continuity requires that the derivative of a segment at t=0 match that of the previous segment at t=1:

$B_s'(0) = B_{s-1}'(1) \Rightarrow C_{s,1} - C_{s,0} = C_{s-1,3} - C_{s-1,2}$

However, another degree of freedom is lost when parametric C1 continuity is imposed which leaves little freedom for producing good fits. Fortunately, all that is needed for the spline to look smooth is geometric (as opposed to parametric) C1 continuity which is less restrictive and requires to constrain only the direction of the second control point:

Geometric C1 Continuity: $C_{s,1} - C_{s,0} = \beta(C_{s-1,3} - C_{s-1,2})$, $\beta > 0$ In accordance with embodiments hereof, geometric C1 continuity may be imposed by projecting the second control point on the required direction, after the update rule has been applied.

Preventing Wobbly Behavior

Figure 4:
FIG. 4 is a schematic diagram showing exemplary wobbly behavior that may be produced by a C1 continuous fitter in accordance with an embodiment of the present invention.
Figure 5:
FIG. 5 is a schematic diagram showing an exemplary continuous spline absent the wobbly behavior shown in FIG. 4, in accordance with an embodiment of the present invention.

At times, implementation of geometric C1 continuity results in the observance of unpleasant wobbly behavior, for instance, as shown in FIG. 4. This behavior often appears worse than the occasional cusps observed in C0 continuous splines. The root cause of this behavior appears to be that the derivative of the last committed Bézier in t=1 does not agree with that of the corresponding digitized points. Therefore, the problem may be mitigated, as illustrated in FIG. 5, by adding a new constraint on the Bézier fitter 228 that the derivative of the Bézier approximation in t=1 must match that of the Bézier approximation or segment connecting the last two digitized points. It should be noted that other mitigations are possible within the scope of embodiments hereof. For instance, both the previous and current Bézier may be updated. Alternatively, two Béziers may be fitted at one time, continuity imposed between the two, and a new pair of Bézier segments started whenever the fitting requirements are not satisfied.

Cusp Detection

While in general C1 continuity is a desirable property, there are cases when it is not beneficial to enforce. Most notably, C1 continuity removes even intended cusps. For this reason, the segmentation component 230 further is configured to configure the Bézier fitter 228 for C1 continuity based on the results of cusp detection.

A straightforward approach to cusp detection is to check the angle formed by the last three points and classify as cusps angles below a predefined threshold. A similar approach is to base the decision on the angle formed by the derivative of the previous segment in t=1 with that of the current segment in t=0. Any and all such approaches, and any combination thereof, are contemplated to be within the scope of embodiments the present invention.

Ink Prediction Component 232

Predicting the next few locations of the input instrument is a difficult problem to solve because handwriting is full of sharp, unpredictable changes in direction and the user may lift the pen (or other input instrument) at any time thereby making the prediction not only unnecessary but potentially harmful.

The ink prediction component 232 is configured to first establish prediction quality by defining a metric that allows evaluation of the quality of an ink prediction. There are two main aspects to consider: user experience and performance. In terms of user experience, the result of a wrong prediction is that a piece of ink is rendered on a screen or other display surface and it is then cleared within a few frames, as soon as the prediction proves wrong. This may produce a flickering effect that is exacerbated when the predictions are not stable across frames. The metric must reflect whether the prediction error can be observed by the end user.

In terms of performance, an exemplary approach is to use the principal components, $\vec{e}_N$ and $\vec{e}_T$ of the error vector as metrics for the quality of prediction. FIG. 5$_T$ provides an example for a five-point-ahead prediction. Digitized points are represented with dots. The ones connected with a solid line 610 have already been digitized, while the ones that are not connected (and appear in the interior of the larger triangle) are in the future. Predicted points are connected by the dashed line 612. The vector $\vec{p}$ connecting the predicted point with the last digitized point is the prediction vector. The vector $\vec{r}$ connecting the digitized point in the future with the last digitized point is the realization vector. The vector is the prediction error, and $\vec{e}_N$ and $\vec{e}_T$ are its principal components. $\vec{e}_T$ measures how much the prediction is lagging or overshooting. $\vec{e}_N$ measures how far off the predicted point is from the realization vector.

One technique that may be used by the ink prediction component 232 for ink prediction involves fitting digitized points with a cubic Bézier spline. The basic idea is to do prediction by extending the last Bézier segment B(t) to its future which simply means sampling B(t) at some t>1 (dashed line in FIG. 6).

Choice of T

Let k be the number of points for which future prediction is desired, and let $d_t = \|P_t - P_{t-1}\|$ be the distance between the last two digitized points. t≥1 may then be selected in such a way that the arc length of the Bézier curve or segment between B(1) and B(t) is equal to k·$d_t$.

Since there is no closed form solution for the arc length of a cubic curve, an approximation may be utilized that exploits a number of known facts. First, the distance between the endpoints of the Bézier curve is a lower bound for its arc length. Second, the length of the control polygon of the Bézier curve is an upper bound for its arc length.

Re-Parameterization

Figure 6:
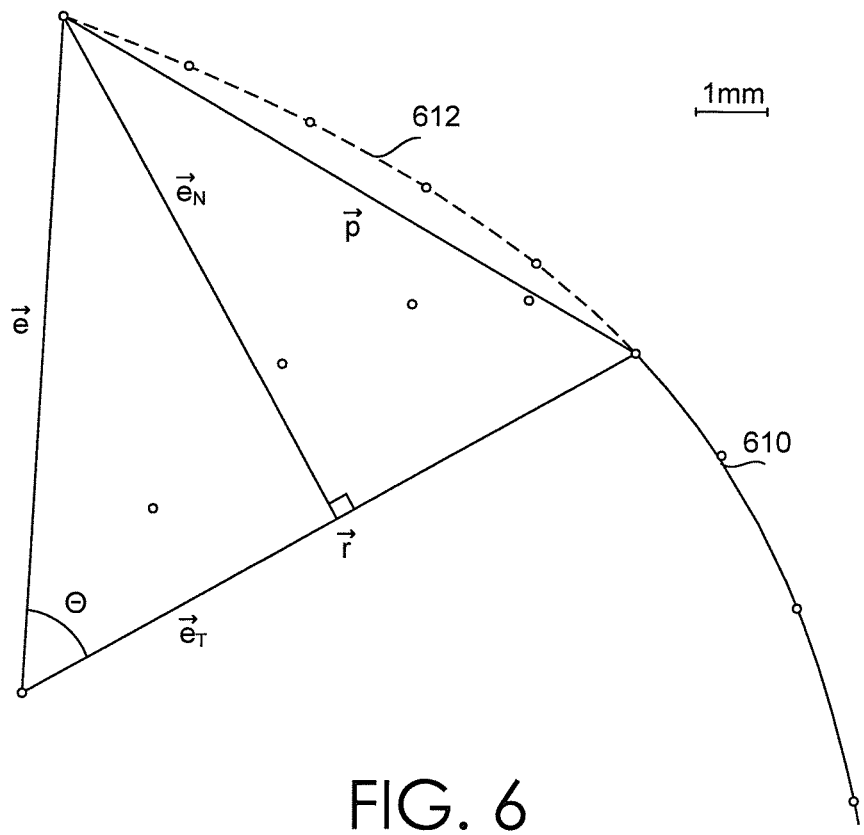
FIG. 6 is a schematic diagram showing exemplary prediction, realization, and error vectors for a five-points-ahead prediction, in accordance with an embodiment of the present invention.

The simplest option for rendering the prediction is to draw a line from the last digitized point to the predicted point. However, a better approach is to draw the extension of the Bézier curve as shown in FIG. 6 (dashed 6 line). Accordingly, the ink prediction component 232 further is configured to re-parameterize the Bézier curve in such a way that the curve is not changed, and:

$B_r(0) = P_t$, $B_r(1) = B(k \cdot d_t)$, where B is the original Bézier and $B_r$ is the re-parameterized one. The cost of re-parameterization is negligible as it can be performed in constant time.

Utilizing this technique, the ink prediction component 232 may make predictions approximately 16 ms ahead without introducing bad artifacts (i.e., visible mispredictions).

Ink Rendering

At the completion of fitting and prediction, the result is a set of Bézier approximations {$B_i(t)$} and a corresponding set of radii {$R_i(t)$}. In general, the $B_i$'s are cubic functions, parameterized by four control points: $B_{i,0}$, $B_{i,1}$, $B_{i,2}$, $B_{i,3}$. In some manifestations, the $R_i$'s may be linear and parameterized only by the start and end radii:

$R_i(t) = (1-t)R_{i,0} + tR_{i,3}$.

In other manifestations, they may be cubic and parameterized by weights at each of the four control points, using Bernstein polynomials, as well-known to those having ordinary skill in the art:

$$R_i(t) = \begin{pmatrix} (1-t)^3 \\ 3(1-t)^2 t \\ 3(1-t)t^2 \\ t^3 \end{pmatrix} \cdot \begin{pmatrix} R_{i,0} \\ R_{i,1} \\ R_{i,2} \\ R_{i,3} \end{pmatrix}$$

Figure 7:
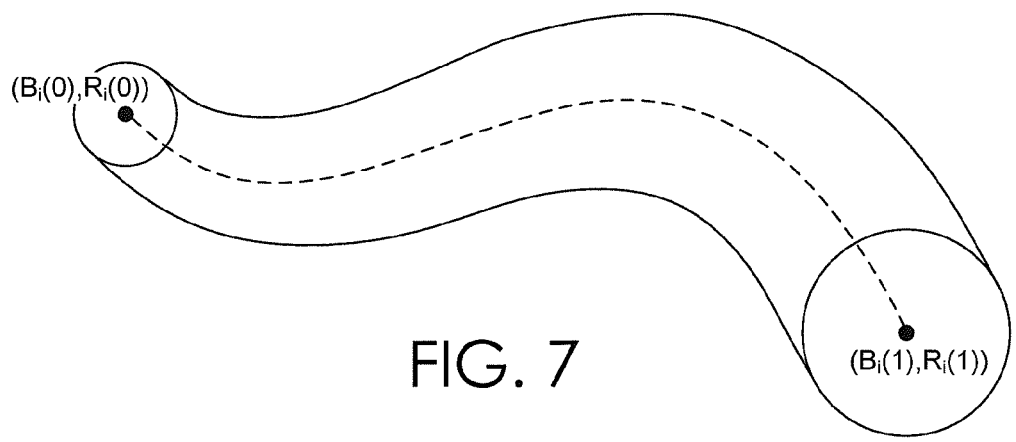
FIG. 7 is a schematic diagram illustrating a segment of an ink stroke, in accordance with an embodiment of the present invention.

Together, a given ($B_i$, $R_i$) pair represents a segment of the ink stroke, as shown in FIG. 7. Symbolically, this corresponds to the locus of points {$B_i(t) + s*R_i(t)$: 0≤s, t≤1}.

Figure 8:
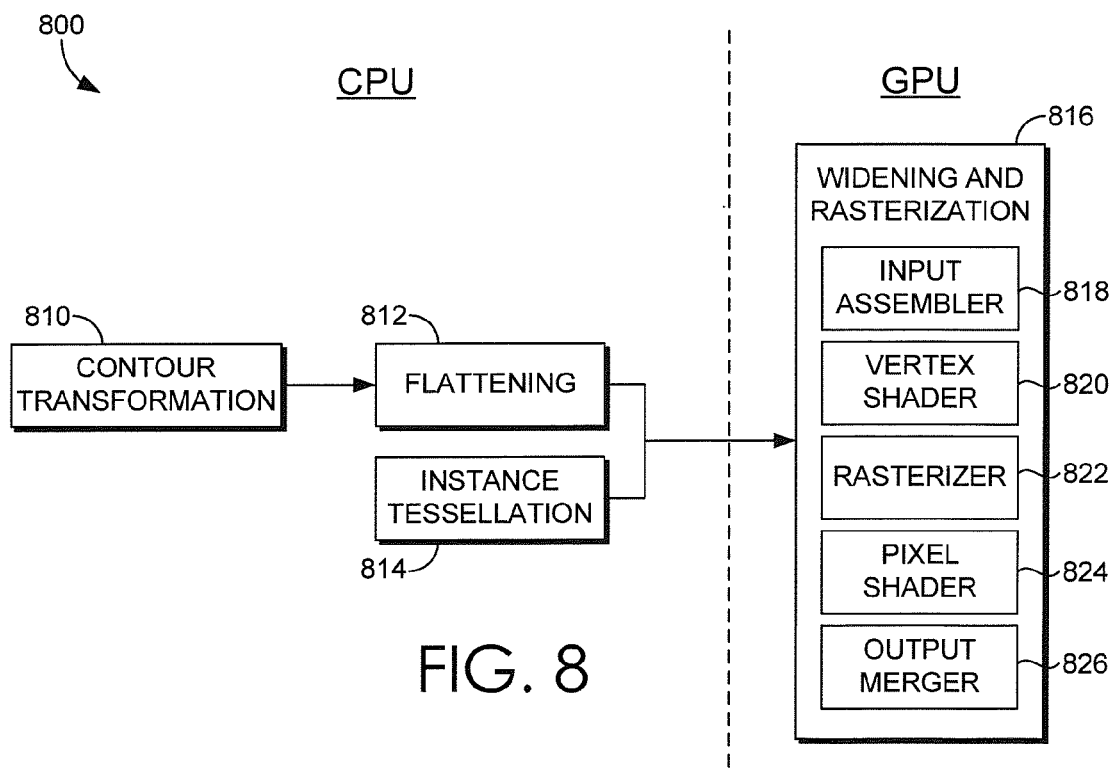
FIG. 8 is a flow diagram showing an exemplary method for rendering ink, in accordance with an embodiment of the present invention.

The flow diagram of FIG. 8 illustrates an exemplary general process 800 for rendering ink, in accordance with embodiments of the present invention. The functions described to the left of the dashed line may be performed, for instance, utilizing the ink rendering component 234 of the ink smoothing engine 212 of FIG. 2. The functions described to the right of the dashed line may be performed, for instance, utilizing the GPU 222 of the user computing device 210 of FIG. 2.

Contour Transformation 810

Embodiments of the present invention permit arbitrary 2D affine transformations (defined by a 3×2 matrix $$M = \begin{pmatrix} m_{11} & m_{12} \\ m_{21} & m_{22} \\ m_{31} & m_{32} \end{pmatrix}$$

to be applied to the ink after the ink has been captured and fitted but before rendering. Such transforms are useful to model, for instance, panning and zooming of a document containing ink.

Transformations are implemented in two steps. In the first step ("contour" transformation), the Bézier functions B(t) are transformed. This is accomplished by simply multiplying the Bézier control points $B_{i,0}$, $B_{i,1}$, $B_{i,2}$, $B_{i,3}$, by the specified matrix (conceptually, this affects the overall shape of the ink, but does not affect the thickness).

The second step is to transform the radii. This is accomplished in the vertex shader 820, more fully described herein below. Note that the translation components of M($m_{31}$ and $m_{32}$) are unused when transforming the radii. Henceforth in the present description, the symbol M will refer to the 2×2 matrix $$\begin{pmatrix} m_{11} & m_{12} \\ m_{21} & m_{22} \end{pmatrix}.$$

Flattening 812

To render a given stroke, each of the constituent Bézier approximations is "flattened." Formally, a set of $t_{i,j}$'s is chosen for each ($B_i$, $R_i$) pair, and the functions are evaluated at those t's (this is essentially curve-fitting in reverse). The exact method for choosing the set of $t_{i,j}$'s is implementation defined. In one exemplary implementation, a Hybrid Forward Differencing algorithm may be utilized as described in U.S. Pat. No. 5,367,617, which is hereby incorporated by reference as if set forth in its entirety herein. It will be understood by those having ordinary skill in the art that other techniques such as forward differencing are common and well-known in the industry and may be utilized as well.

The result is a list of points and radii ($p_1$, $r_1$), . . . , ($p_n$, $r_n$) lying along the curve. This data is then sent to the GPU and stored in a so-called "vertex buffer" (henceforth designated VB1).

Instance Tessellation 814

Also passed to the GPU are two other vertex buffers: one containing a triangle mesh approximating a circle and the other a triangle mesh representing a trapezoid. These meshes are computed once during initialization and are cached and reused on subsequent rendering operations.

Particular implementations may represent the tessellations in differing ways. One exemplary implementation utilizes the following scheme:

Each vertex in the circle triangle mesh contains the following data:

CenterOrEdge: 1 bit (0: Center, 1: Edge)
InteriorOrExterior: 1 bit (0: Interior, 1: Exterior)
Direction: float2 (normalized)

The triangles connecting interior and exterior vertices are used to provide antialiasing (designated by the light-to-dark gradient illustrated in FIG. 8). It should be noted that no absolute coordinates are actually stored on a vertex, only the topological relationship of the vertex as it relates to the others is recorded. For instance, vertex A in the following diagram is an interior edge vertex and would be stored as:

(CenterOrEdge: 1, InteriorOrExterior: 0, Direction: (1,0))

while vertex B is an exterior edge vertex and would be stored as:

(CenterOrEdge: 1, InteriorOrExterior: 1, Direction: $(\cos\frac{\pi}{5}, \sin\frac{\pi}{5})$)

Figure 9:
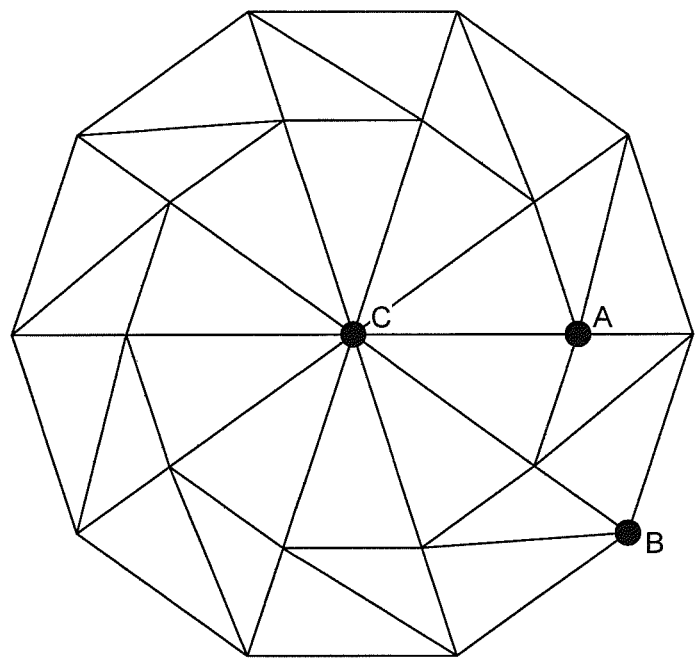
FIG. 9 is a schematic diagram illustrating an exemplary implementation of an instance tessellation, in accordance with an embodiment of the present invention.

(assuming an inverted y axis). There is only one center vertex (designated C in FIG. 9), which is interior and gets assigned an arbitrary direction.

It should also be noted that the exact number of triangles (and hence vertices) can vary in the implementation and is generally dependent upon the maximum radius of the ink being rendered.

Each vertex in the trapezoid contains the following data:
StartOrEnd: 1 bit (0: Start, 1: End)
InteriorOrExterior: 1 bit (0: Interior, 1: Exterior)
TopOrBottom: 1 bit (0: Top, 1: Bottom)

For instance, vertex A in the following diagram is an interior start vertex on the top and would be stored as:

(StartOrEnd: 0, InteriorOrExterior: 0, TopOrBottom: 0).

Figure 10:
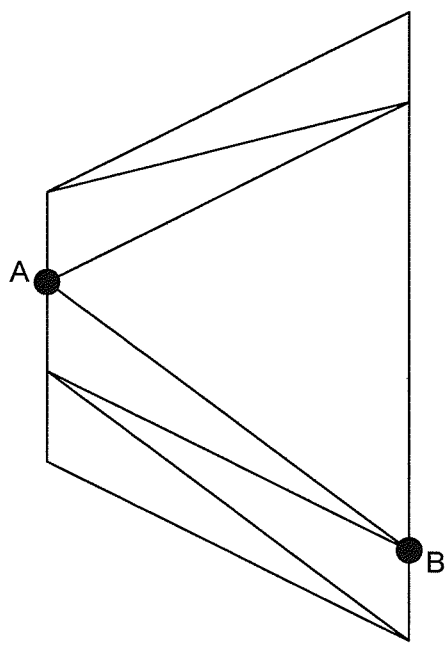
FIG. 10 is a schematic diagram illustrating another exemplary implementation of an instance tessellation, in accordance with an embodiment of the present invention.

Vertex B is an interior end vertex on the bottom and would be stored as:

(StartOrEnd: 1, InteriorOrExterior: 0, TopOrBottom: 1)

as shown in FIG. 10. In this case, the number of unique vertices is fixed at eight, regardless of the radius of the ink being rendered.

Widening and Rasterization 816

Once the data is uploaded to the GPU, the remaining steps of rasterization are performed in two passes: one to render circles and one to render trapezoids. One exemplary implementation performs each pass using, for instance, the five stages of the standard Direct3D pipeline described below (818, 820, 822, 824, and 826). It will be understood and appreciated by those of ordinary skill in the art that other directly analogous implementations to Direct3D are possible on other platforms such as OpenGL. Any and all such variations, and any combination thereof, are contemplated to be within the scope of embodiments of the present invention.

The input assembler 818, the rasterizer 822, and the output merger 826 are fixed-function and performed essentially automatically by the GPU itself. The vertex shader 820 and the pixel shader 824 are programmable.

Input Assembler 818

The input assembler 818 is configured to take the circle/trapezoid meshes and the vertices in VB1 and prepare them for processing by the remainder of the pipeline. In part, this involves replicating copies of the meshes across the vertices in VB1 (a common technique known to those having ordinary skill in the art as "instancing"). In the circle pass, the input assembler 818 is configured to allocate one copy of the mesh per vertex in VB1. In the trapezoid pass, the input assembler 818 allocates one copy per pair of consecutive vertices in VB1. The vertices output by the input assembler 818 contain the merged data from both the mesh and the VB1 data:

Circle Pass Vertex Format:
(CenterOrEdge,InteriorOrExterior,Direction,$p_i$,$r_i$
Trapezoid Pass Vertex Format:
(StartOrEnd,InteriorOrExterior,TopOrBottom,$p_i$,$r_i$,$p_{i+1}$, $r_{i+1}$)

Vertex Shader 820

In accordance with embodiments hereof, a vertex shader 820 is provided, which takes each vertex output by the input assembler 818 and condenses it down to a position and opacity. For the circle pass, the following formulae are used:

$$\frac{\text{Direction} * (M^{-1})^t}{\|\text{Direction} * (M^{-1})^t\|}$$

$$D = \text{Direction} * M$$

Position=$p_i$+CenterOrEdge*($r_i$*$D$+offset(InteriorOrExterior,$D \cdot N$)*$N$)

Opacity=(1−InteriorOrExterior)*opacityModifier($D \cdot N$)

Here, M is the 2×2 matrix defined earlier in the document, and $(M^{-1})^t$ is its inverse transpose.

The offset and opacityModifier functions are discussed in greater detail later, but in the common case they are simply $$\text{offset}(a, r) = \left(\frac{1}{2} - a\right)$$

and opacityModifier(r)=1.

For the trapezoid pass, more complex formulas may be used:

$$d = \|p_{i+1} - p_i\|$$

$$r = (1 - StartOrEnd) * r_i + StartOrEnd * r_{i+1}$$

$$s = \frac{r_{i+1} - r_i}{d} \; (= \sin\alpha)$$

$$c = \sqrt{1 - s^2} \; (= |\cos\alpha|)$$

$$\vec{u} = -s * r * \frac{p_{i+1} - p_i}{d}$$

$$\vec{v} = c * r * \frac{(p_{i+1} - p_i)Rot_{90°}}{d}$$

$$P = (1 - StartOrEnd) * p_i + StartOrEnd * p_{i+1}$$

$$\vec{D} = (\vec{u} + (2 * TopOrBottom - 1)\vec{v})M$$

$$\vec{N} = \frac{\vec{D}(M^{-1})^t}{\|\vec{D}(M^{-1})^t\|}$$

-continued $$\text{Position} = P + \vec{D} + \text{offset}(\textit{InteriorOrExterior}, \vec{D} \cdot \vec{N}) * \vec{N}$$

$$\text{Opacity} = (1 - \textit{InteriorOrExterior}) * \text{opacityModifier}(\vec{D} \cdot \vec{N})$$

Here, $\text{Rot}_{90}°$ is the 90-degree rotation matrix $$\begin{pmatrix} 0 & 1 \\ -1 & 0 \end{pmatrix}.$$

It should be noted that similar versions of these formulas have been used in earlier versions of ink rendering. Unlike previous incarnations, however, embodiments of the present invention perform the transformation on the GPU.

Figure 11:
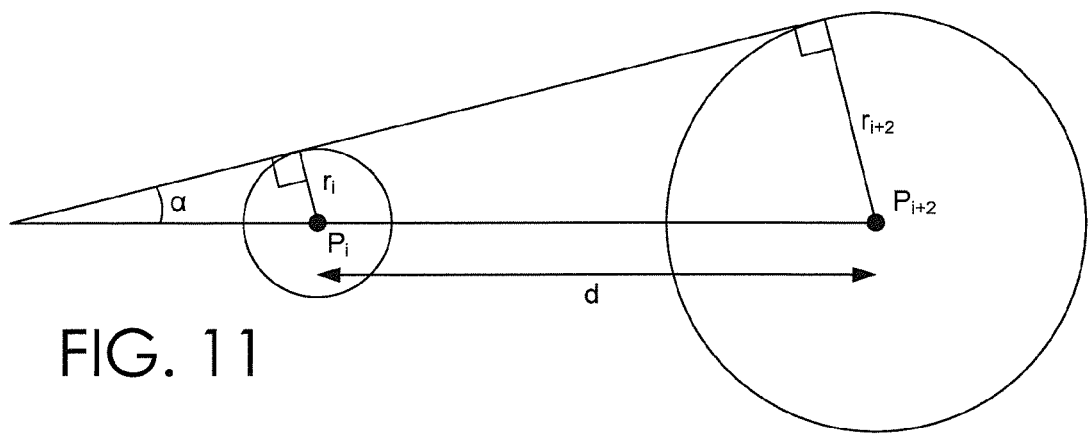
FIG. 11 is a schematic diagram of two adjacent ink points (assuming M is identity), in accordance with an embodiment of the present invention.
Figure 12:
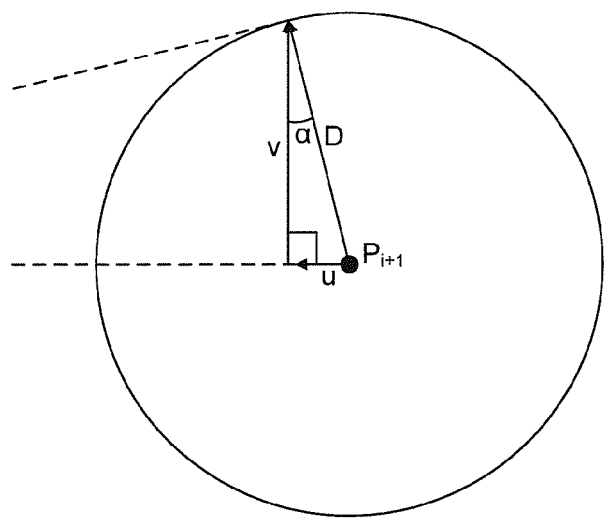
FIG. 12 is a schematic diagram illustrating a close-up around P(i+1) (assuming TopOrBottom=0, StartOrEnd=1, and M is identity), in accordance with an embodiment of the present invention.
Figure 13:
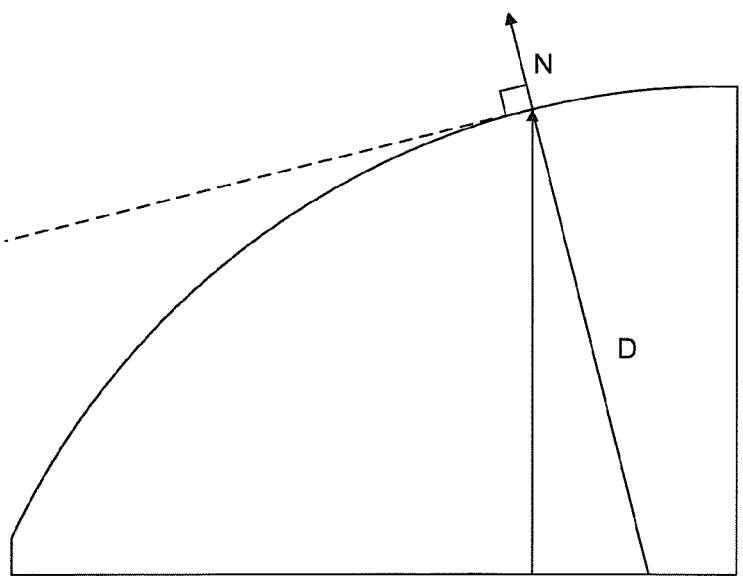
FIG. 13 is a schematic diagram illustrating a close-up of a portion of FIG. 12 around P+D (assuming TopOrBottom=0, StartOrEnd=1, and M is identity)

It should further be noted that derivations of these formulas are beyond the scope of the present description. However, FIGS. 11, 12, and 13 may assist in relating the various quantities to each other. FIG. 11 illustrates a diagram of two adjacent ink points (assuming M is identity). FIG. 12 illustrates a close-up around P(i+1) (assuming TopOrBottom=0, StartOrEnd=1, and M is identity). FIG. 13 illustrates a close-up around P+D (assuming TopOrBottom=0, StartOrEnd=1, and M is identity).

Rasterizer 822

Once the vertices of the replicated meshes have been transformed, the corresponding triangles are "rasterized" by the GPU utilizing rasterizer 822. In other words, the pixels covered by the triangles are identified and the pixel shader 824 is invoked once per covered pixel. D3D rasterization is known to those having ordinary skill in the art and, accordingly, is not further described herein.

Pixel Shader 824

The pixel shader 824 is configured to take the opacity from the rasterizer 8222 and use it to modulate the color of the ink:

$$\text{Color}_{output} = \text{Opacity} * \text{Color}_{input}$$

This color modulation simulates antialiasing along the edges of the ink. (In some manifestations, this is a simple solid color, but in more complex manifestations the color may be dependent on the location of the pixel). This color value is then passed to the output merger 826.

Output Merger 826

The output merger 826 is configured to take the color value and blend it onto the render target. Output merging is known to those having ordinary skill in the art and, accordingly, is not further described herein.

Thin Feature Mitigation

As mentioned herein above, embodiments of the present invention supply a vertex shader 820 that makes use of two auxiliary functions, offset and opacityModifier. The purpose of offset is to offset the vertex by one-half pixel in screen-space, simulating antialiasing. When the dimensions of the circle/trapezoid being rendered are less than 1 pixel, special logic may be added to reduce the chance that this offsetting will cause overlapping triangles. When such logic is performed, the opacity of the vertex is correspondingly modified.

The complete definitions of offset and opacityModifier are as follows:

$$\text{offset}(\textit{InteriorOrExterior}, r) =$$

$$\begin{cases} \textit{InteriorOrExterior} - \frac{1}{2} & r \geq \frac{1}{2} \\ \frac{\textit{InteriorOrExterior}}{2} - (1 - \textit{InteriorOrExterior}) * r & r < \frac{1}{2} \end{cases}$$

$$\text{opacityModifier}(r) = \begin{cases} 1 & r \geq \frac{1}{2} \\ 2r & r < \frac{1}{2} \end{cases}$$

Figure 14:
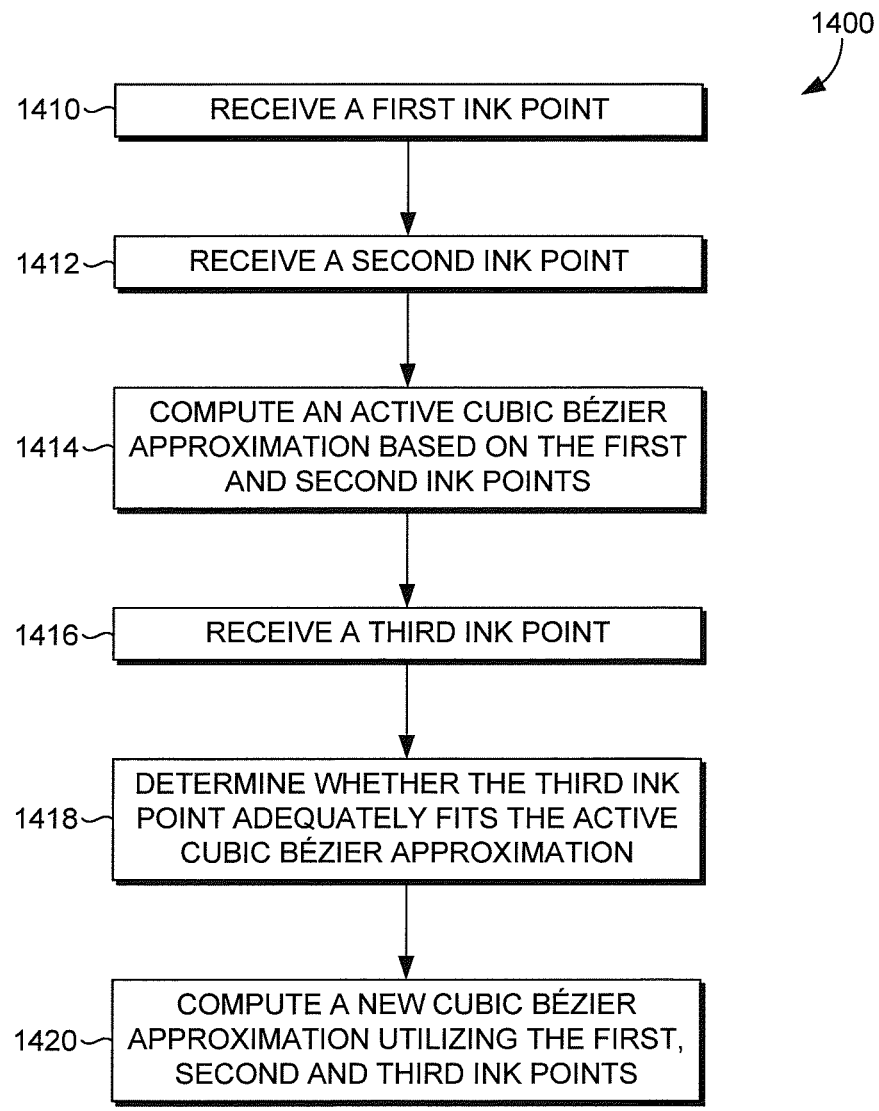
FIG. 14 is a flow diagram illustrating an exemplary method for smoothing digital ink input, in accordance with an embodiment of the present invention.

Turning now to FIG. 14, a flow diagram is illustrated showing an exemplary method 1400 for smoothing digital ink input, in accordance with an embodiment of the present invention. As indicated at block 1410, a first ink point is received. A second ink point is also received, as indicated at block 1412. As indicated at block 1414, an active cubic Bézier approximation is computed based on the first and second ink points. A third ink point is received, as indicated at block 1416. It is determined whether the third ink point adequately fits the active cubic Bézier approximation, as indicated at block 1418, and a new cubic Bézier approximation is computed utilizing the first, second and third ink points, as indicated at block 1420.

Figure 15:
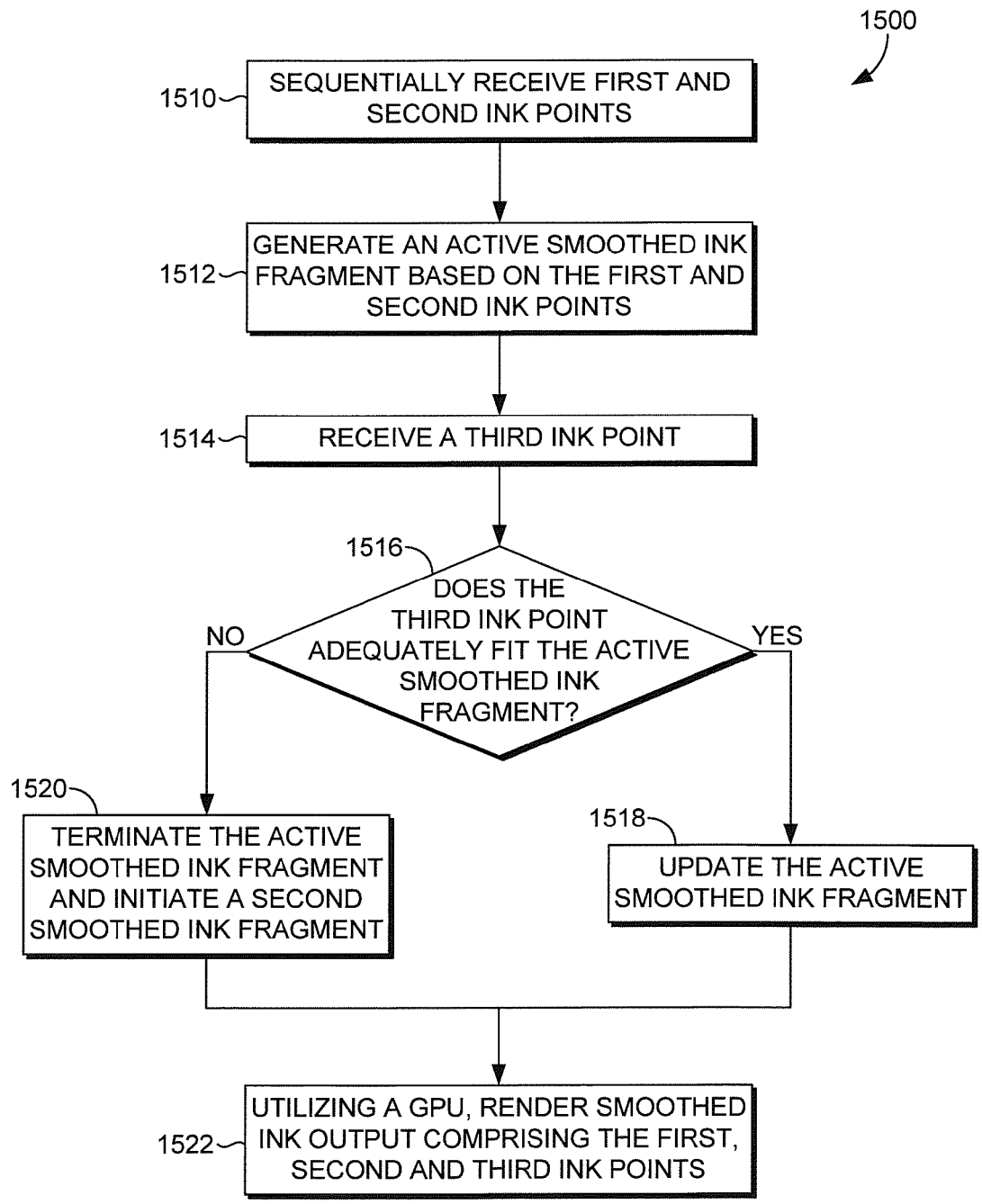
FIG. 15 is a flow diagram illustrating an exemplary method for smoothing and rendering digital ink input, in accordance with an embodiment of the present invention.

With reference to FIG. 15, a flow diagram is illustrated showing an exemplary method 1500 for smoothing and rendering digital ink input, in accordance with an embodiment of the present invention. As indicated at block 1510, receives first and second ink points; are sequentially received. As indicated at block 1512, an active smoothed ink fragment is generated based on the first and second ink points. A third ink point is received, as indicated at block 1514. It is then determined whether the third ink point adequately fits the active smoothed ink fragment, as indicated at decision block 1516. If it is determined that the third ink point adequately fits the active smoothed ink fragment, the active smoothed ink fragment is updated, as indicated at block 1518. If, however, it is determined that the third ink point does not adequately fit the active smoothed ink fragment, the active smoothed ink fragment is terminated and a second smoothed ink fragment is initiated, as indicated at block 1520. Utilizing a GPU, smoothed ink output is rendered comprising the first, second and third ink points. This is indicated at block 1522.

Figure 16:
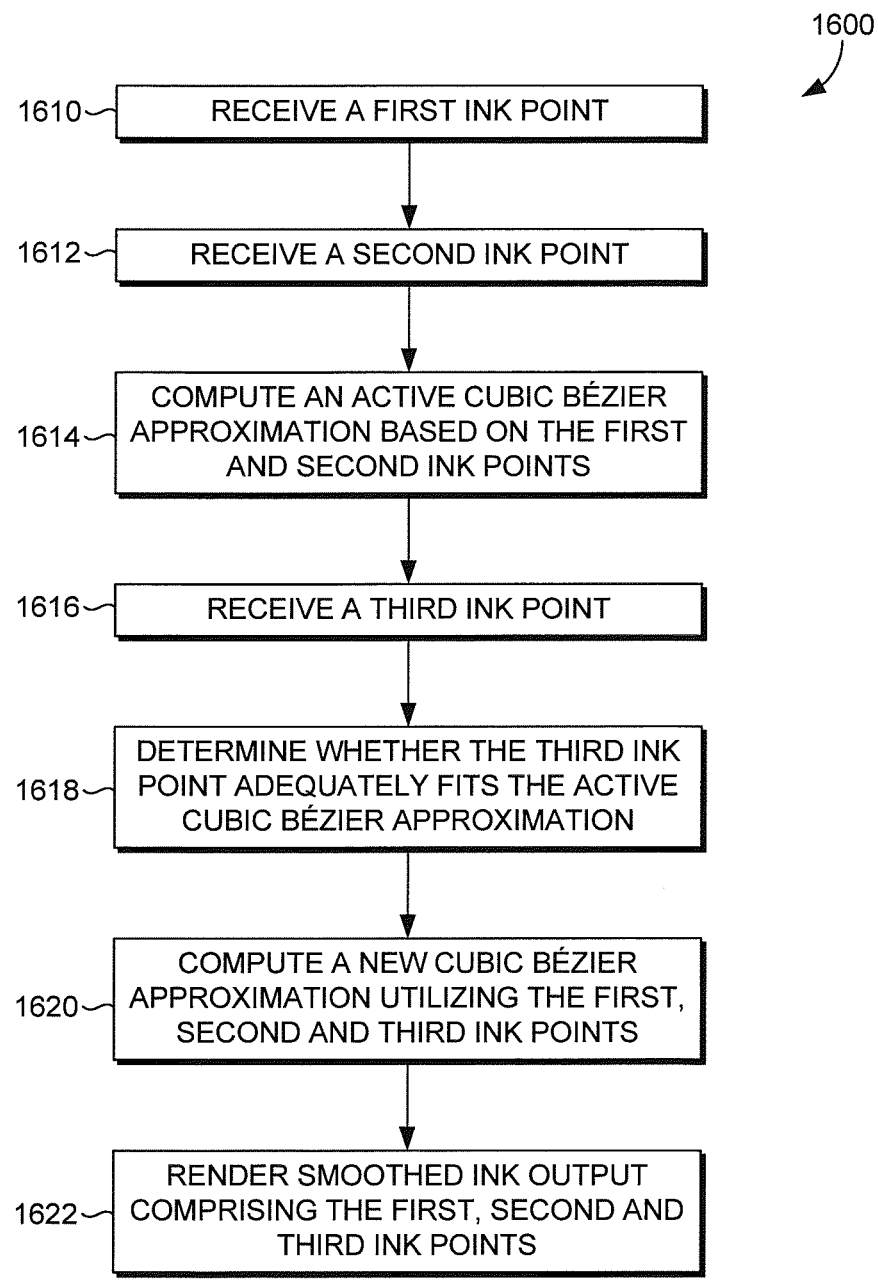
FIG. 16 is a flow diagram illustrating another exemplary method for smoothing and rendering digital ink input, in accordance with an embodiment of the present invention.

Turning now to FIG. 16, a flow diagram is illustrated showing an exemplary method 1600 for smoothing and rendering digital ink input, in accordance with an embodiment of the present invention. As indicated at block 1610, a first ink point is received. A second ink point is also received, as indicated at block 1612. As indicated at block 1614, an active cubic Bézier approximation is computed based on the first and second ink points. A third ink point is received, as indicated at block 1616. It is then determined whether the third ink point adequately fits the active cubic Bézier approximation, as indicated at block 1618. As indicated at block 1620, a new cubic Bézier approximation is computed utilizing the first, second and third ink points. Smoothed ink output is then rendered comprising the first, second and third ink points. This is indicated at block 1622.

As can be understood, embodiments of the present invention provide systems, methods, and computer-readable storage media for, among other things, efficient real-time ink stroke smoothing, trajectory prediction, and GPU-leveraged rendering of ink stroke input. A plurality of ink points including at least a first and a second ink point is received.

Based upon the first and second ink points, an active Bézier approximation is computed. Sequentially in time to the first and second ink points, a third ink point is received and it is determined whether the third ink point adequately fits the active Bézier approximation. The third ink point is determined to adequate fit the active Bézier approximation if it is determined that a user would be unable to detect a difference there between upon rendering. Such determination is generally based upon a pre-determined threshold difference value. If it is determined that the third ink point adequately fits the active Bézier approximation, the active Bézier approximation is updated to include the third ink point. If, however, it is determined that the third ink point does not adequately fit the active Bézier approximation, the active Bézier approximation is terminated and a new Bézier approximation is computed. Smoothed ink output is rendered comprising the first, second and third ink points in association with a stroke receiving surface, for instance, a touch-sensitive display screen.

The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the methods 1400 of FIG. 14, 1500 of FIG. 15, and 1600 of FIG. 16 is not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. A method being performed by one or more computing devices including at least one processor, the method for smoothing digital ink input received via a stroke receiving surface, the method comprising:
    receiving a plurality of ink points and establishing a first set of ink points;
    computing a first cubic Bezier approximation based on the first set of ink points;
    receiving a first additional ink point sequentially and later in time with respect to the first set of ink points;
    based at least on receiving the first additional ink point, dynamically determining whether the first additional ink point fits the first cubic Bezier approximation;
    based at least on a determination that the first additional ink point fits the first cubic Bezier approximation:
        updating the first set of ink points and the first cubic Bezier approximation to include the first additional ink point; and
        generating a first smoothed ink output comprising the updated first set of ink points;
    based at least on a determination that the first additional ink point does not fit the first cubic Bezier approximation:
        terminating the first set of ink points and establishing a second set of ink points; and
        initiating a second cubic Bezier approximation utilizing at least the first additional ink point; and
    rendering, on a display associated with the stroke receiving surface, the first smoothed ink output.

2. The method of claim 1, further comprising receiving a second additional ink point, sequentially and later in time with respect to the first additional ink point and determining whether the second additional ink point fits one of the first cubic Bezier approximation, and the second cubic Bezier approximation.

3. The method of claim 2, further comprising generating and rendering a second smoothed ink output comprising the second additional ink point.

4. The method of claim 1, further comprising determining if one or more intended cusps are present, wherein C1 continuity is preserved between the first cubic Bezier approximation and the second cubic Bezier approximation when no intended cusps are detected.

5. The method of claim 1, wherein the plurality of ink points in the first set of ink points and the first additional ink point are sequentially received as they are digitized, and wherein the first Bezier approximation is computed while an input instrument continues to provide input data.

6. The method of claim 1, wherein determining whether the first additional ink point adequately fits the first cubic Bezier approximation comprises approximating a distance between a polyline described by an ink point in the first set of ink points immediately prior to and the first additional ink point and the first cubic Bezier approximation.

7. The method of claim 6, wherein if the distance between the polyline connecting the ink point in the first set of ink points immediately prior to the first additional ink point and the first cubic Bezier approximation is less than or equal to a threshold value, it is determined that the first additional ink point adequately fits the first cubic Bezier approximation.

8. The method of claim 7, wherein the threshold value is based, at least in part, on one or both of the resolution of a display on which the digital ink is rendered and a transform with which the digital ink is rendered.

9. The method of claim 1, further comprising predicting at least one subsequent ink point to be received at a later point in time by extending the first Bezier approximation into the future.

10. A system comprising:
    a central processing unit that:
        sequentially receives a plurality of ink points including at least a first ink point and a second ink point;
        generates an active smoothed ink fragment based at least on the first and second ink points;
        receives a third ink point, sequentially and later in time with respect to the first and second ink points;
        based at least on receiving the third ink point, dynamically determines whether the third ink point adequately fits the active smoothed ink fragment; and
        based at least on determining that the third ink point adequately fits the active smoothed ink fragment, updates the active smoothed ink fragment, else terminates the active smoothed ink fragment and initiates a second smoothed ink fragment; and
    a graphics processing unit that renders smoothed ink output comprising at least the first, second and third ink points in association with a display surface.

11. The system of claim 10, wherein the central processing unit generates the active smoothed ink fragment by fitting Bezier curves to at least the first and second ink points.

12. The system of claim 10, wherein the central processing unit sequentially receives the first, second, and third ink points as they are digitized, and wherein the active smoothed ink fragment is computed while an input instrument continues to provide continuous input data.

13. The system of claim 10, wherein the central processing unit determines whether the third ink point adequately fits the active smoothed ink fragment by approximating a distance between a polyline described by the second and third ink points and the active smoothed ink fragment.

14. The system of claim 13, wherein if the distance between the polyline connecting the second and third ink points and the smoothed ink fragment is less than or equal to a threshold value, it is determined that the third ink point adequately fits the active smoothed ink fragment.

15. The system of claim 10, wherein the graphics processing unit renders the smoothed ink output by, in part, positioning pre-generated tessellation of circular dots and quads on the display surface.

16. The system of claim 10, wherein the graphics processing unit employs thin feature mitigation in rendering the smoothed ink output.

17. An apparatus, comprising:
at least one processor; and
a memory storing a digital ink smoothing and rendering routine, the digital ink smoothing and rendering routine, when executed by the at least one processor, causing the apparatus to:
receive a first ink point;
receive a second ink point;
compute an active cubic Bezier approximation based at least on the first and second ink points;
receive a third ink point, sequentially and later in time with respect to the first and second ink points;
based at least on receiving the third ink point, dynamically determine whether the third ink point adequately fits the active cubic Bezier approximation;
compute a new cubic Bezier approximation utilizing at least the first, second and third ink points; and
render smoothed ink output comprising at least the first, second and third ink points in association with a display surface.

18. The apparatus of claim 17, wherein based at least on the apparatus determining that the third ink point does adequately fit the active cubic Bezier approximation, the digital ink smoothing and rendering routine causes the apparatus to compute a new cubic Bezier approximation by updating the active cubic Bezier approximation.

19. The apparatus of claim 17, wherein based at least on the apparatus determining that the third ink point does not adequately fit the active cubic Bezier approximation, the digital ink smoothing and rendering routine causes the apparatus to compute a new cubic Bezier approximation by terminating the active cubic Bezier approximation and initiating a second cubic Bezier approximation.

20. The apparatus of claim 17, further comprising a graphics processing unit that rasterizes and merges the smoothed ink output for rendering.

* * * * *